(12) United States Patent
Muscariello et al.

(10) Patent No.: US 11,722,427 B1
(45) Date of Patent: Aug. 8, 2023

(54) HYBRID DEADLINE-BASED TRANSPORT FOR GROUP APPLICATIONS USING HYBRID INFORMATION-CENTRIC NETWORKING (HICN)

(71) Applicant: Cisco Technology, Inc., San Jose, CA (US)

(72) Inventors: Luca Muscariello, Paris (FR); Giovanna Carofiglio, Paris (FR); Mauro Sardara, Issy-les-Moulineaux (FR); Michele Papalini, Issy les Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/686,598

(22) Filed: Mar. 4, 2022

(51) Int. Cl.
*H04L 47/283* (2022.01)
*H04L 47/12* (2022.01)
*H04L 1/08* (2006.01)
*H04L 1/00* (2006.01)

(52) U.S. Cl.
CPC ............ *H04L 47/283* (2013.01); *H04L 1/004* (2013.01); *H04L 1/08* (2013.01); *H04L 47/12* (2013.01)

(58) Field of Classification Search
CPC ....... H04L 47/283; H04L 47/28; H04L 47/12; H04L 1/004; H04L 1/0618; H04L 1/08
See application file for complete search history.

(56) References Cited

U.S. PATENT DOCUMENTS

| | | |
|---|---|---|
| 6,594,798 B1 | 7/2003 | Chou et al. |
| 7,174,180 B2 | 2/2007 | Andrews et al. |
| 7,298,719 B2 | 11/2007 | Andrews et al. |
| 7,681,101 B2 | 3/2010 | Oran et al. |
| 7,733,911 B2 | 6/2010 | Lee |

(Continued)

FOREIGN PATENT DOCUMENTS

| | | | | |
|---|---|---|---|---|
| CN | 101568037 A | * | 10/2009 | |
| CN | 102195752 A | * | 9/2011 | ............ G06F 11/10 |

(Continued)

OTHER PUBLICATIONS

"HICN", online: https://wiki.fd.io/view/HICN, Mar. 27, 2020, accessed Feb. 17, 2022, 4 pages, fd.io.

*Primary Examiner* — Phong La
(74) *Attorney, Agent, or Firm* — Behmke Innovation Group LLC; James M. Behmke; Jonathon P. Western

(57) ABSTRACT

In one embodiment, a device that executes an application obtains a delay budget objective for traffic for the application to be sent by a Hybrid Information-Centric Networking source to the device. The device makes a determination as to whether the traffic for the application to be sent by the Hybrid Information-Centric Networking source to the device should use a forward error correction mechanism or a retransmission mechanism, in an attempt to optimize the delay budget objective. The device sends, to the Hybrid Information-Centric Networking source, a Hybrid Information-Centric Networking request for the traffic for the application, wherein the Hybrid Information-Centric Networking request is indicative of the determination. The device receives, from the Hybrid Information-Centric Networking source, one or more packets of the traffic for the application, after sending the Hybrid Information-Centric Networking request.

20 Claims, 7 Drawing Sheets

(56) References Cited

U.S. PATENT DOCUMENTS 8,499,212 B2     7/2013  Wu et al.
2010/0005360 A1* 1/2010  Begen ................ G06F 11/1443
                                                714/751

FOREIGN PATENT DOCUMENTS

CN       112350803 A  *  2/2021  ............ H04L 1/004
CN       115347992 A  *  11/2022
KR       20070070064     7/2007

* cited by examiner

HYBRID DEADLINE-BASED TRANSPORT FOR GROUP APPLICATIONS USING HYBRID INFORMATION-CENTRIC NETWORKING (HICN)

TECHNICAL FIELD

The present disclosure relates generally to computer networks, and, more particularly, to hybrid deadline-based transport for group applications using Hybrid Information-Centric Networking (hICN).

BACKGROUND

Multicast communication has been optimized for networks where each group member of a multicast group has similar network characteristics (e.g., in terms of bandwidth, packet loss rates, minimum latency, etc.). However, when a given multicast group presents the problem of members of displaying various network path characteristics, optimizations for multicast protocols are not as well-suited for solving this problem. Of note, wireless network technologies with multi-rate physical layers offer almost no multicast support, and terrestrial broadcast technologies are based on single bitrate transmissions. Further, while Wi-Fi protocols (e.g., IEEE 802.11) support multicast transmission, these have relatively poor performance and little (or no) use in practice.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
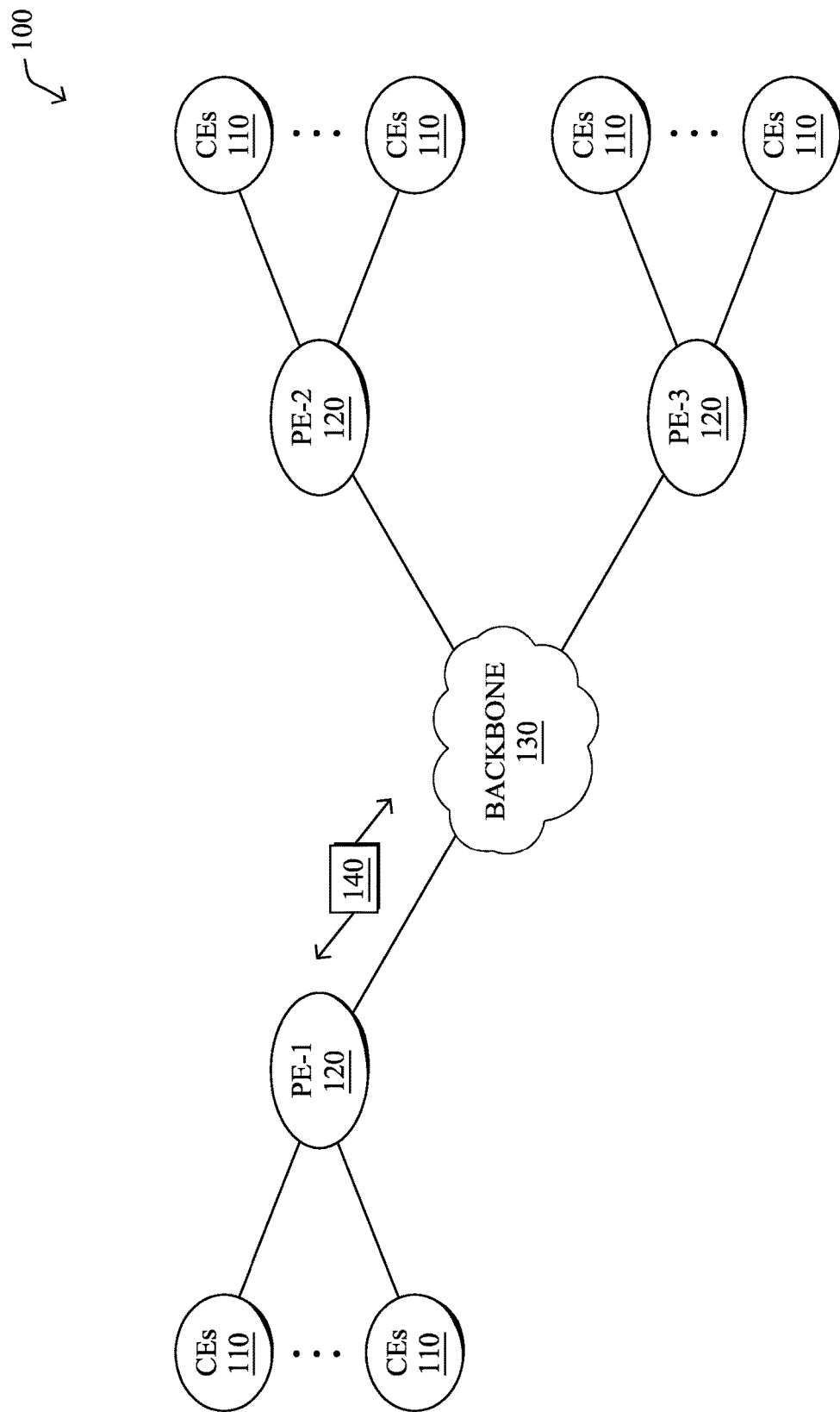
FIGS. 1A-1B illustrate an example communication network.

According to one or more embodiments of the disclosure, a device that executes an application obtains a delay budget objective for traffic for the application to be sent by a Hybrid Information-Centric Networking source to the device. The device makes a determination as to whether the traffic for the application to be sent by the Hybrid Information-Centric Networking source to the device should use a forward error correction mechanism or a retransmission mechanism, in an attempt to optimize the delay budget objective. The device sends, to the Hybrid Information-Centric Networking source, a Hybrid Information-Centric Networking request for the traffic for the application, wherein the Hybrid Information-Centric Networking request is indicative of the determination. The device receives, from the Hybrid Information-Centric Networking source, one or more packets of the traffic for the application, after sending the Hybrid Information-Centric Networking request.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
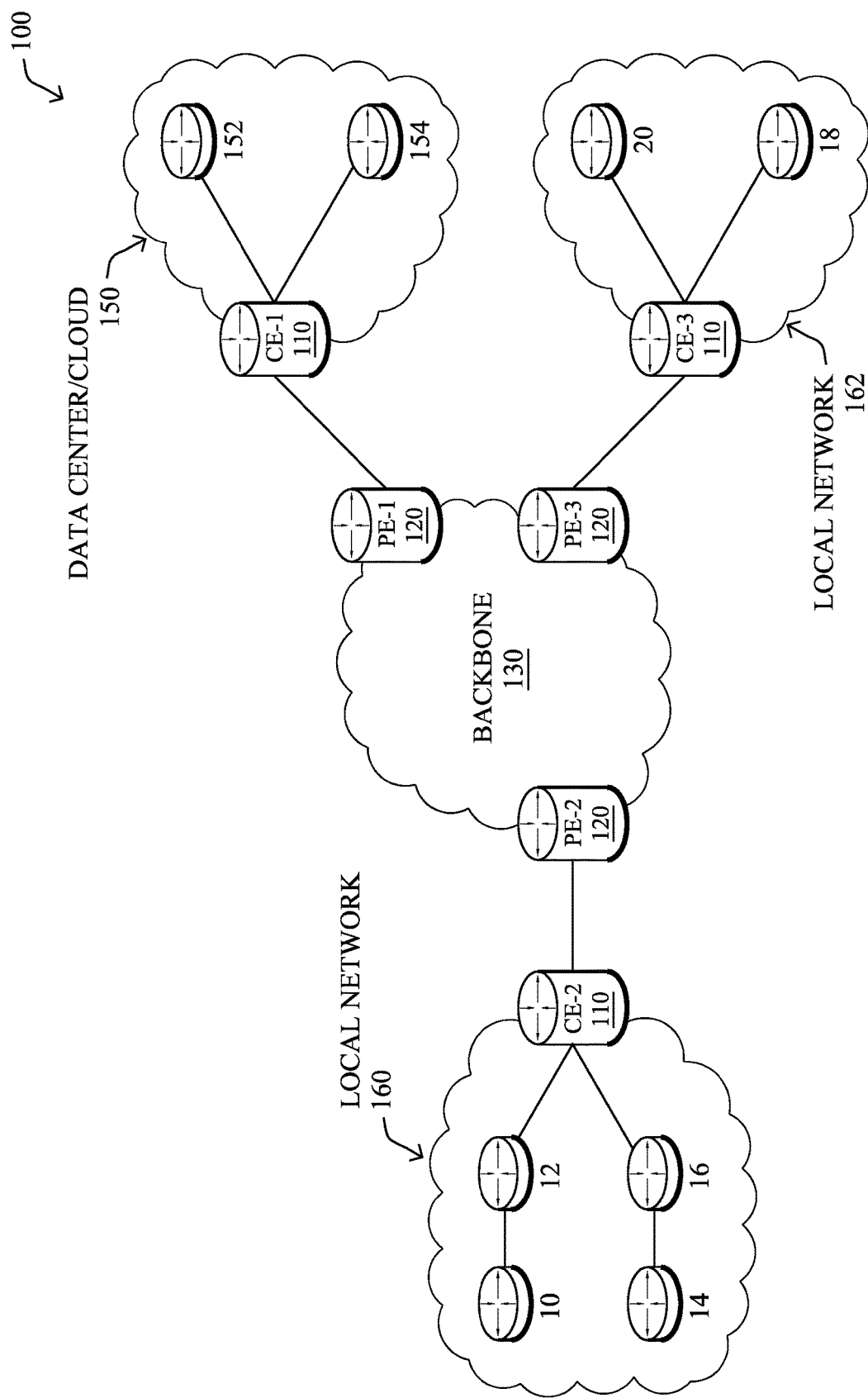

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
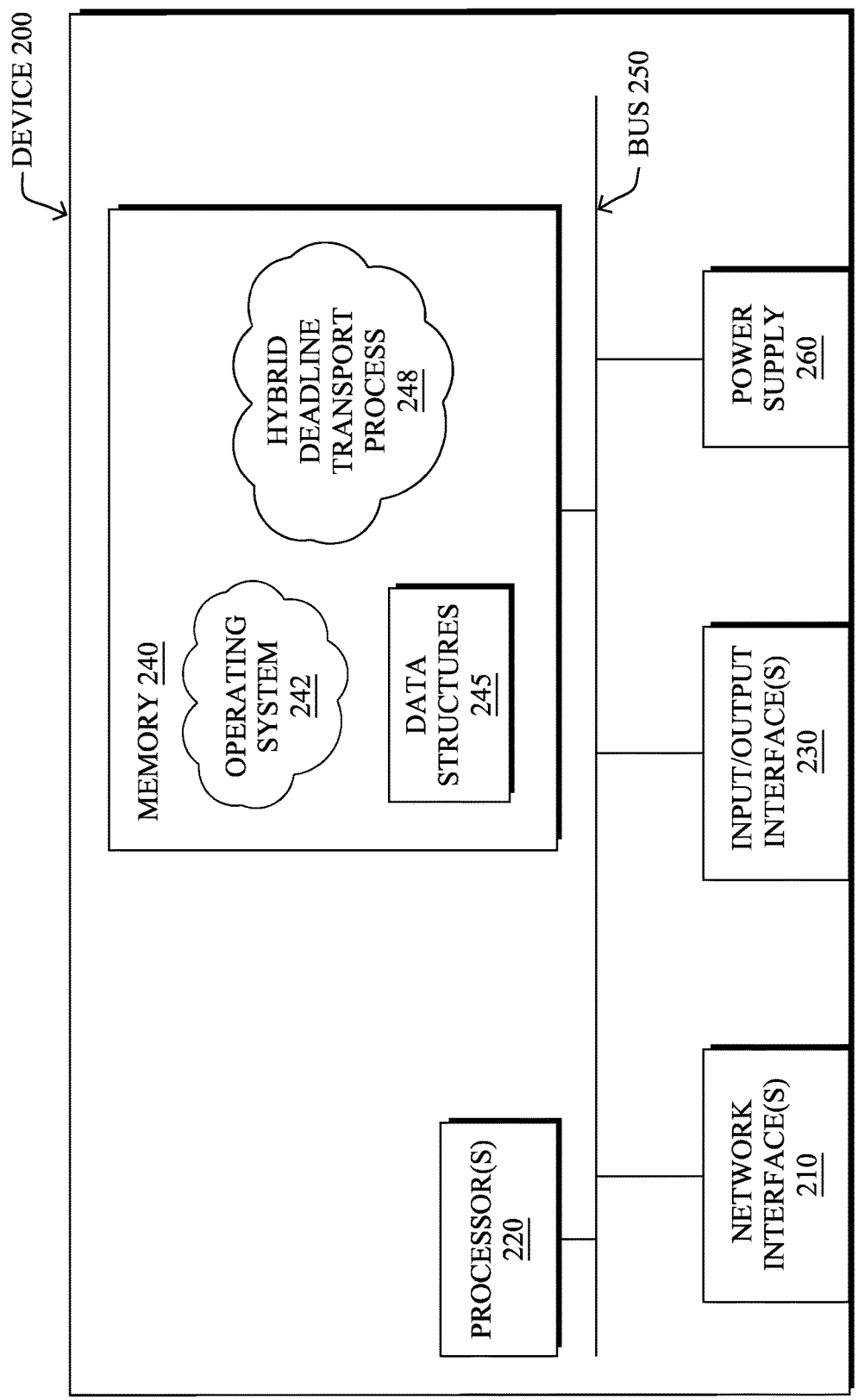
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, physical network interfaces 210 may also be used to implement one or more virtual network interfaces, such as for virtual private network (VPN) access, known to those skilled in the art. As is understood in the art, network interfaces 210 may comprise a plurality of network interfaces used for a variety of networking communication protocols, for example, Wi-Fi, cellular (LTE, 5G, etc.), Bluetooth, etc.

Depending on the type of device, other interfaces, such as input/output I/O interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute or cause the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise hybrid deadline transport process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, multicast communication has been optimized for networks where each group member of a multicast group has similar network characteristics (e.g., in terms of bandwidth, packet loss rates, minimum latency, etc.). For example, Pragmatic General Multicast (PGM) is a multicast communications protocol that is generally suited for communications that have fixed, or close to fixed, network characteristics. One example of such use case includes broadcast television streams. However, when a given multicast group presents the problem of members of displaying various network path characteristics, optimizations for multicast protocols are not as well-suited for solving this problem. Of note, wireless network technologies with multi-rate physical layers offer almost no multicast support, and terrestrial broadcast technologies are based on single bitrate transmissions. Further, while Wi-Fi protocols (e.g., IEEE 802.11) support multicast transmission, these have relatively poor performance and little (or no) use in practice. It is generally understood that, to implement Wi-Fi with multicast communication, a Wi-Fi access point has to be configured to transmit with particular settings, including a lower physical bitrate and a largest code protection.

Accordingly, for Internet-wide applications, multicast internet protocol support is not deployable, and, unicast communication is the only available option. Moreover, applications are increasingly configured to execute/run on a plurality of computing devices, including mobile devices like cellphones, tablets, etc. These mobile devices have increasingly been configured to access computer networks using, at least Wi-Fi communications and/or cellular communications, as main network access technologies. Group-based applications for mobile devices (e.g., online meeting, multiplayer gaming, financial technology, etc.), have increasingly required reliable multicast communication support under heterogeneous channel conditions with multiple media quality transport.

Figure 3:
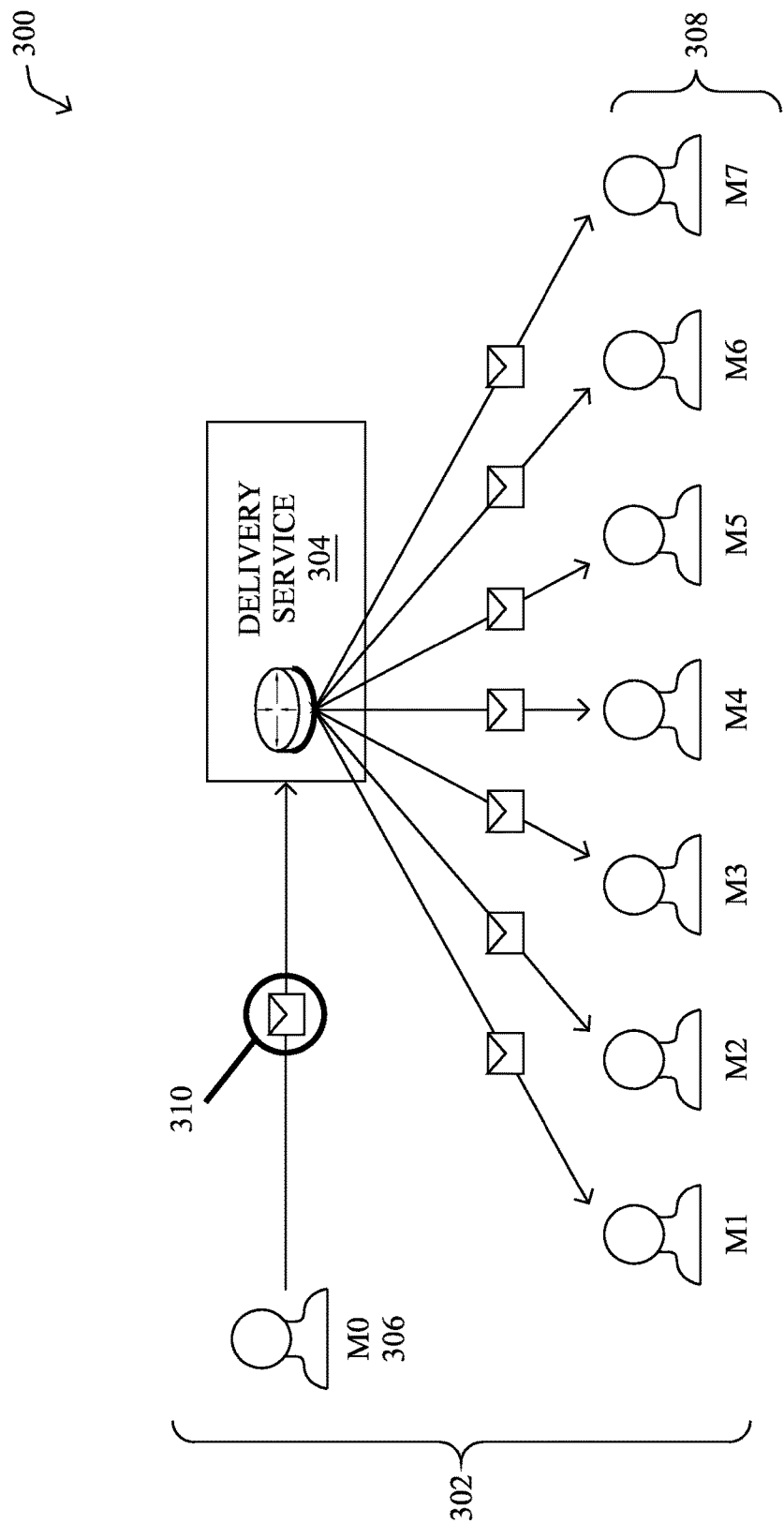
FIG. 3 illustrates an example architecture for devices using Hybrid Information-Centric Networking (hICN)

Hybrid Information-Centric Networking has been introduced to jointly provide reliable multicast communication support in a publisher/subscriber mode. Such support enables the ability to realize multicast groups under unicast IP transport conditions. For example, FIG. 3 illustrates an example architecture 300 for devices using Hybrid Information-Centric Networking (hICN). As shown, architecture 300 may include a plurality of group members 302 (e.g., comprising mobile devices like cellphones, tablets, etc.) that are configured to communicate with one another using hICN. hICN, generally, is an architecture that brings information-centric networking into IPv6, and, by doing that, enables generalization of IPv6 networking by using location-independent name-based networking. This may be enabled at either a network layer and/or at a transport layer by also providing name-based sockets to applications. By reusing and extending existing IPv6 protocols and architectures, hICN provides deployable hybrid solutions that are tailored to various use cases and application needs.

Each of plurality of group members 302 may be equipped, configured, etc. with one or more hICN transport services, for example, by using one or more application programming interface (APIs) (e.g., producer-consumer, publisher-subscriber, push-pull, etc.). That is, a producer/publisher (e.g., over a communication socket) may be implemented such that it binds a name prefix, where the name prefix may be used to pull data, information, etc. by consumers/subscribers (e.g., over a communication socket). Generally, an hICN name prefix may be an internet protocol version 6 (IPv6) address number, as defined in hICN. Further, an hICN name prefix is understood to be a location independent name (topic, data identifier, etc.) that hides network topologies details to both consumers and producers (e.g., among plurality of group members 302). Content that may be published from one group member to the other group members may include various messages, including a commit message that is used to update group membership or create Messaging Layer Security (MLS) groups, application messages, etc.

In the example shown in FIG. 3, delivery service 304 may be configured to use a hICN based broadcast service that is configured to publish content from group member 306 to group members 308. Similarly, group members 308 may be equipped, configured, etc. with one or more hICN transport services, for example, by using one or more APIs. It is, however, contemplated that for certain hICN applications do not require delivery service 304 and that requests may be sent from each of group members 308 to group member 306 (and vice versa). In the example shown in FIG. 3, message 310 sent by group member 306 may include requested application information/data that is to be "pulled" directly from group members 308 or via delivery service 304.

Generally, however, hICN does not specify, much less require, a combined (or "joint") Automatic Repeat Request (ARQ) and/or forward error correction (FEC) mechanism that allows for improved channel reliability for real-time interactive group applications, for example, that plurality of group members 302 may be executing. That is, conventionally, in publisher-subscriber multicast groups, a data source is configured to use either a FEC code rate that is common to the whole group (based on the worst observed/measured channel conditions in the group) or as many FEC code rates as a number of group members (e.g., in a hICN group). Either of these scenarios are suboptimal in that the former case can potentially "waste" resources (due to poor scaling when a spectrum of channel/path condition is large) and the latter linearly scales resource usage (based on group size) as in a unicast scenario. FEC necessarily requires that additional packets be sent, even though they might not be used. In lieu of FEC, a retransmission-based mechanism may be implemented, for example, when a minimum latency is below a certain level (e.g. 100 milliseconds (ms)). However, when the minimum latency is large, FEC is the only possible strategy as there is not enough time for retransmission of a lost packet.

Hybrid Deadline-Based Transport for Group Applications Using Hybrid Information-Centric Networking (hICN)

The techniques herein, therefore, introduce mechanisms for hybrid deadline-based transport for group applications using Hybrid Information-Centric Networking (hICN). Of note, there are multicast communication scenarios (e.g., network quality conditions) where a minimum latency varies between low to large. In such scenarios, an optimal or near optimal error correction strategy is a mix of both ARQ and adaptive FEC code rates. Features of hICN may be leveraged such that group members in a hICN group that pull information may be customized with hybrid ARQ strategies, while keeping producers, which publish information to the group members, stateless. ARQ and FEC may be jointly optimized so that multicast communications among a group of devices does not suffer from path heterogeneity (e.g., changing or varying path conditions between individual group members and a publisher as well as among the individual group members). Particularly, resource usage may be constant and does not depend on a given multicast group's size.

Illustratively, the techniques described herein may be performed by hardware, software, and/or firmware, such as in accordance with hybrid deadline transport process 248, which may include computer executable instructions executed by the processor 220 (or independent processor of interfaces 210) to perform functions relating to the techniques described herein.

Specifically, according to various embodiments, a device that executes an application obtains a delay budget objective for traffic for the application to be sent by a Hybrid Information-Centric Networking source to the device. The device makes a determination as to whether the traffic for the application to be sent by the Hybrid Information-Centric Networking source to the device should use a forward error correction mechanism or a retransmission mechanism, in an attempt to optimize the delay budget objective. The device sends, to the Hybrid Information-Centric Networking source, a Hybrid Information-Centric Networking request for the traffic for the application, wherein the Hybrid Information-Centric Networking request is indicative of the determination. The device receives, from the Hybrid Information-Centric Networking source, one or more packets of the traffic for the application, after sending the Hybrid Information-Centric Networking request.

Figure 4:
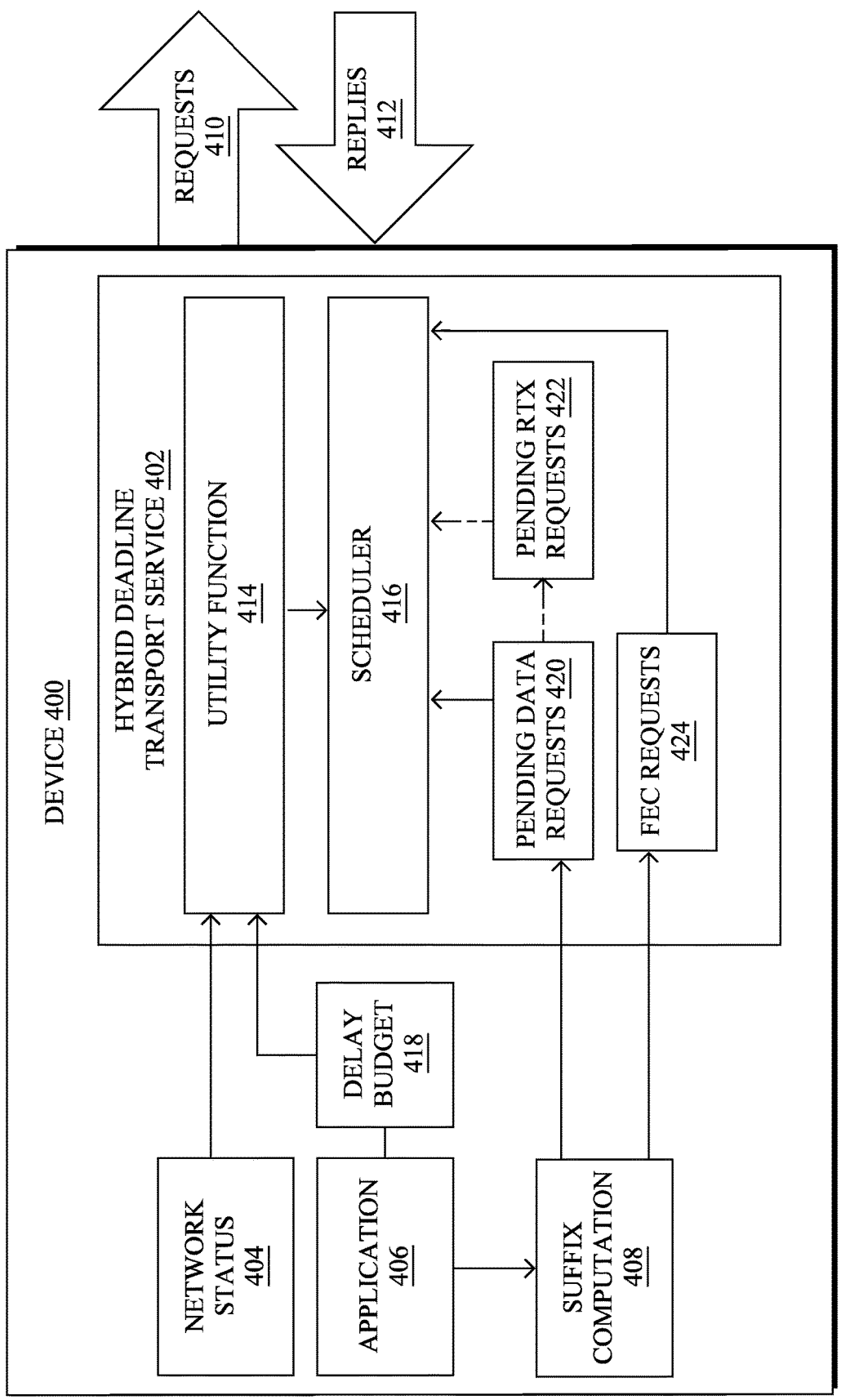
FIG. 4 illustrates an example device for hybrid deadline-based transport for group applications using hICN.

Operationally, FIG. 4 illustrates an example device for hybrid deadline-based transport for group applications using hICN, where device 400 may include hybrid deadline transport service 402 (that comprise components, hardware, software, etc. that are used to implement hybrid deadline transport process 248), network status component 404, multicast group application 406, and a suffix computation component 408 (that may be used to implement one or more hICN services and/or communication). Generally, as is understood in the art, device 400 may comprise a mobile device that is part of a group devices that execute multicast group application 406, where requests for information 410 and replies to request 412 are used to exchange application information/data used by multicast group application 406.

In multicast communication groups, publishers/senders of information are stateless and are required to service multiple devices (e.g., device 400 and other devices that execute multicast group application 406) in reliable manner. That is, information needs to be exchanged between publishers/senders and subscribers/receivers within time bounds (i.e., by certain deadlines). Individual subscribers of information are expected and configured to recover packets that are lost in transmission from the publishers/senders. These packets may be ones requested and received according to hICN. As is understood in that art, individual subscribers (e.g., device 400), generally, may be configured with two mechanisms to recover lost packets (i.e., an error correction strategy). These include:

1) Retransmission-based mechanisms where, when a packet is not received, a requester/subscriber sends a request for one or more missing packets. In this mechanism, when a packet is identified as being lost, missing, corrupted, etc., the packet may be requested and retrieved from an original producer (or from another source like a network cache). Generally, retransmission-based mechanisms require a minimal amount of additional bandwidth for communication channel between a subscriber and producer. However, retransmission necessarily adds latency. Of note, after detection of packet loss, a device requires one unit of round trip time (RTT) to recover a missing packet.

2) Forward Error Correction-based (FEC-based) mechanisms, where a source of data (e.g., a producer), in addition to requested information/data, sends an extra stream of information (e.g., an FEC stream). Overall, FEC-based mechanisms add a minimal amount of additional latency to recover losses but necessarily requires extra bandwidth. In hICN implementations, since hICN is a pull-based protocol, extra streams of information are not sent to a subscriber/requester unless explicitly requested. Accordingly, in such implementations, a producer may generate a FEC stream with a constant code rate (n, k) that targets a high loss rate. That is, a requester/subscriber of data in hICN implementations are only required to request for FEC packets according to loss rate(s) measured locally at a level of a particular requester/subscriber (e.g., at the device). In particular, given an FEC code (n, k) and a loss probability L, a requester/subscriber needs to request for k original packets in addition to min(n−k, k*L) FEC packet(s).

Hybrid deadline transport service 402 includes utility function 414 that, in combination with scheduler 416, minimizes a probability of delay budget objective 418 (of M users), which is an application-specific, being violated. Notably, during execution of multicast group application 406 on device 400, at any time, N number of packets may be pending, where the packets may include pending data requests 420, pending retransmission requests 422, and FEC requests 424 (which are all to be scheduled by scheduler 416). Generally, delay budget objective 418 may be assumed to be convex. Utility function 414, assuming that packet loss rate and minimum latency are constant while jitter a random variable, may be used to compute one or more scheduling matrices for every new transmission. When utility function 414 is jointly optimized with congestion control, N may be made part of the objective to optimize for $$f(R, p) = \mathbb{P}(D_i > d) \le \delta_i \text{ for } i = 1, \ldots, N.$$

$$f(R_n, p_n) = f(R_{n-1}, p_{n-1}) + \nabla f \cdot (R_{n-1}, p_{n-1})$$

$$f(R_{n-1}, p_{n-1}) + \nabla f \cdot (R_{n-1}, p_{n-1}) \le \delta$$

That is, utility function 414, by monitoring R (e.g., rate of flow) and p (loss probability) statistics of various communication channels (e.g., using network status component 404), may estimate $f(\ )$, which is an activation function that determines when the RTX or FEC (i.e., make a determination as to what error correction mechanism should be used) is to be requested by device 400. It is to be understood that a long-term ratio of RTX to FEC usage will minimize the deadline goal, specific to multicast group application 406, and that $f(\ )$ may be computed analytically for some loss patterns.

Figure 5:
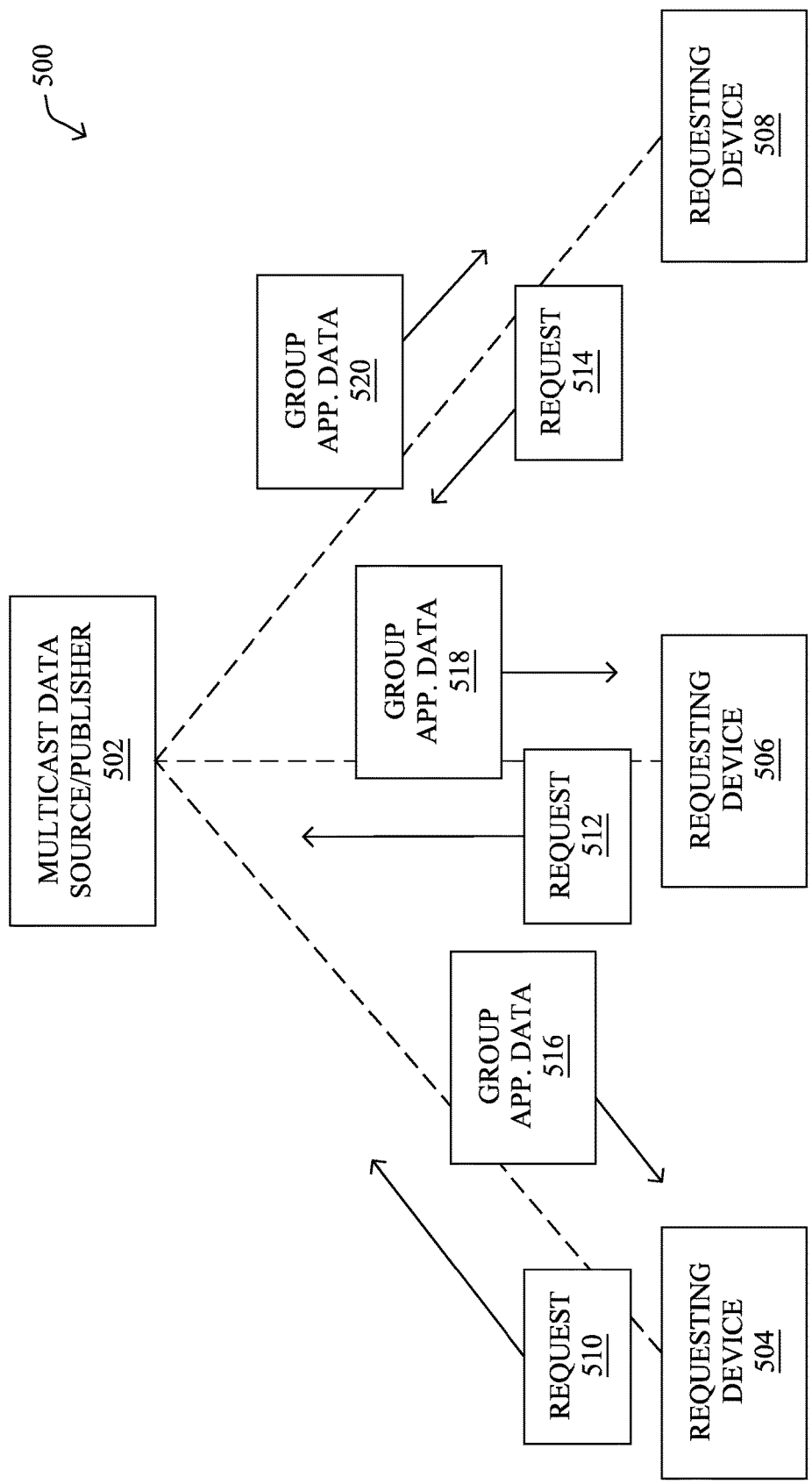
FIG. 5 illustrates an example architecture for hybrid deadline-based transport for group applications using hICN.

Turning now to FIG. 5, FIG. 5 illustrates an example architecture for hybrid deadline-based transport for group applications using hICN. Architecture 500 includes multicast data source/publisher 502 that is configured to execute a group application with an overall global delay budget objective, where multicast data source/publisher 502 from time-to-time may provide information for the group application using hICN. First requesting device 504, second requesting device 506, and third requesting device 508, along with multicast data source/publisher 502, may individually execute the group application, and in certain scenarios, each of the requesting devices may be required to pull/request information from multicast data source/publisher 502. Communication channel conditions, quality, etc. between each of the requesting devices and multicast data source/publisher 502 may vary. Under conventional communication standards a baseline or "worst case" measurement of conditions could be measured, and each of the requesting devices would be forced to implement and request an error correction mechanism that is not optimized for a particular requesting device.

According to the techniques described herein, however, each of the requesting devices may perform local network quality measurements and/or determinations, then request an optimal (or near optimal) error connection mechanism for a given transmission between a given requesting device and multicast data source/publisher 502. In the example shown in FIG. 5:

1) requesting device 504 may obtain channel condition measurement(s), and based on determination(s) by hybrid deadline transport service 402 request that a FEC-based error correction mechanism is to be requested at a first rate in a request 510, based on the global delay budget objective of the group application;

2) requesting device 506 may obtain channel condition measurement(s) and based on determination(s) by hybrid deadline transport service 402 request that a retransmission-based error correction mechanism is to be requested in a request 512, based on the global delay budget objective of the group application; and 3) requesting device 508 may obtain channel condition measurement(s) and based on determination(s) by hybrid deadline transport service 402 request that a FEC-based error correction mechanism is to be requested at a second rate in a request 514, based on the global delay budget objective of the group application;

In response to receiving the requests 510-514, multicast data source/publisher 502 may be configured to transmit group application data to a corresponding requesting device, using a request error correction mechanism. That is, group application data 516 may include requested application data as well as FEC packets according to the first rate, group application data 518 may include requested application data; and group application data 520 may include requested application data as well as FEC packets according to the first rate. Each of the requesting devices are then enabled to reconstruct one or more packets based on an error correction mechanism determined by hybrid deadline transport service 402. It is to be understood that each of the above-described requests and responses (of data) may be generated, determined, published, etc. according to the hICN protocol and techniques, as described herein.

Figure 6:
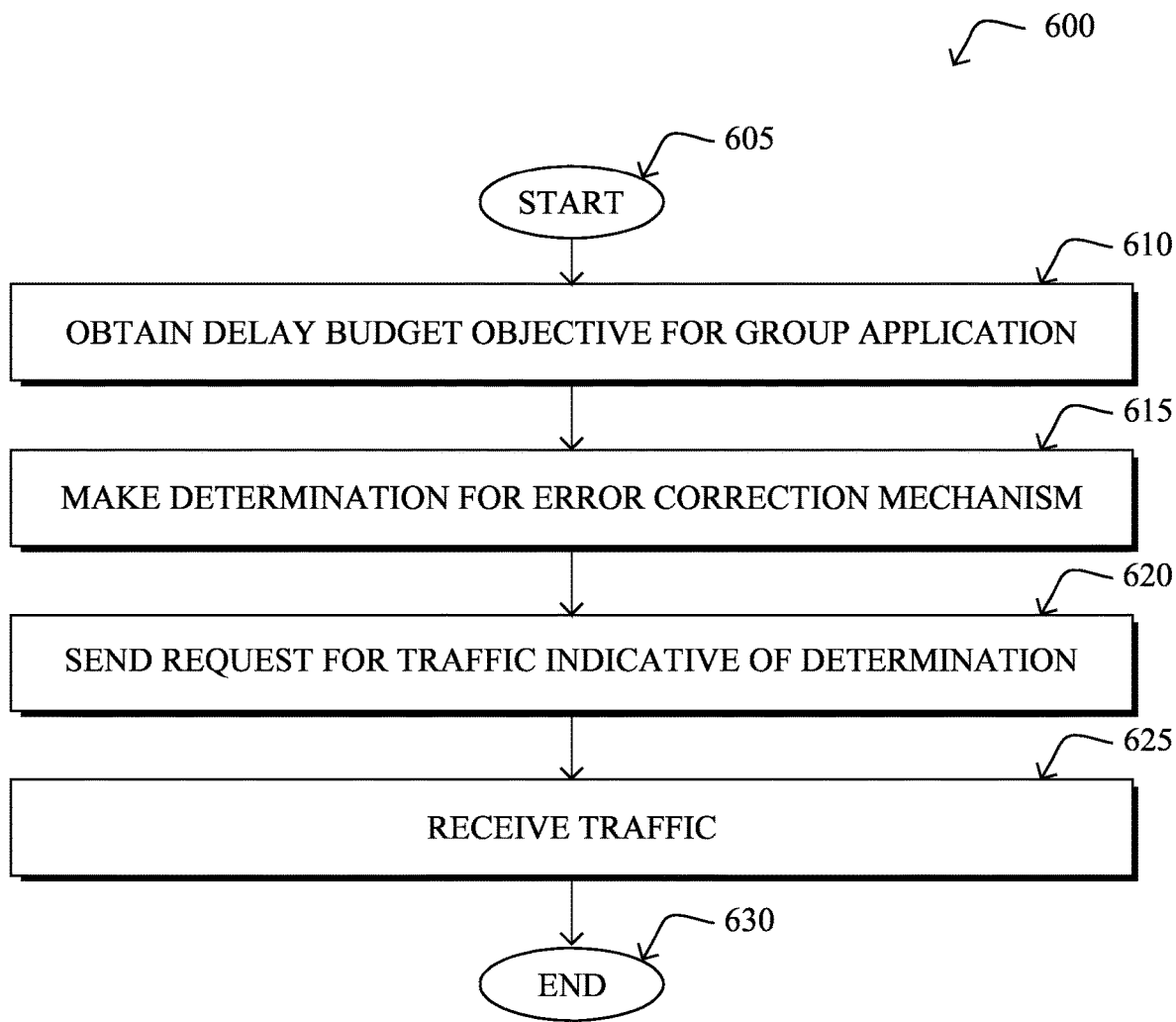
FIG. 6 illustrates an example simplified procedure for hybrid deadline-based transport for group applications using hICN.

FIG. 6 illustrates an example simplified procedure (e.g., a method) for hybrid deadline-based transport for group applications using Hybrid Information-Centric Networking (hICN), in accordance with one or more embodiments described herein. For example, a non-generic, specifically configured device (e.g., device 200), may perform procedure 600 by executing stored instructions (e.g., hybrid deadline transport process 248). The procedure 600 may start at step 605, and continues to step 610, where, as described in greater detail above, a device that executes an application may obtain a delay budget objective for traffic for the application to be sent by a Hybrid Information-Centric Networking source to the device. In an embodiment, the application may be a group to application executed by a plurality of devices in communication with one another.

At step 615, as detailed above, the device may make a determination as to whether the traffic for the application to be sent by the Hybrid Information-Centric Networking source to the device should use a forward error correction mechanism or a retransmission mechanism, in an attempt to optimize the delay budget objective. In an embodiment, the determination may be based on rate of flow or loss probability of a communication channel used by the device. In one or more embodiments, the attempt to optimize the delay budget objective may be based on a number of devices executing the application in a group. In a further embodiment, the attempt to optimize the delay budget objective may take into consideration congestion control.

At step 620, the device may send, to the Hybrid Information-Centric Networking source, a Hybrid Information-Centric Networking request for the traffic for the application, wherein the Hybrid Information-Centric Networking request is indicative of the determination. In one or more embodiments, the Hybrid Information-Centric Networking request for the traffic for the application may include an additional request for retransmission of a packet when the determination is that the retransmission mechanism should be used. In an embodiment, the Hybrid Information-Centric Networking request for the traffic for the application may include a forward error correction request when the determination is that the forward error correction mechanism should be used. In a further embodiment, the forward error correction request may include a particular forward error correction rate determined based on a loss probability.

At step 625, as detailed above, the device may receive, from the Hybrid Information-Centric Networking source, one or more packets of the traffic for the application, after sending the Hybrid Information-Centric Networking request. In an embodiment, the device may reconstruct a packet for the application using the forward error correction mechanism. In one or more embodiments, the device may reconstruct a packet for the application using the retransmission mechanism. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for hybrid deadline-based transport for group applications using hICN, particularly for multicast communication scenarios (e.g., network quality conditions) where a minimum latency varies between low to large. Features of hICN may be leveraged such that group members in a hICN group that pull information may be customized with hybrid ARQ strategies, while keeping producers, which publish information to the group members, stateless. ARQ and FEC may be jointly optimized so that multicast communications among a group of devices does not suffer from path heterogeneity, specifically by using an optimal or near optimal error correction strategy. As a result, resource usage may be constant and does not depend on a given multicast group's size.

While there have been shown and described illustrative embodiments that provide hybrid deadline-based transport for group applications using hICN, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, by a device that executes an application, a delay budget objective for traffic for the application to be sent by a Hybrid Information-Centric Networking source to the device;
   making, by the device, a determination as to whether a forward error correction mechanism or a retransmission mechanism is to be used by the traffic for the application to be sent by the Hybrid Information-Centric Networking source to the device, in an attempt to optimize the delay budget objective;
   sending, by the device and to the Hybrid Information-Centric Networking source, a Hybrid Information-Centric Networking request for the traffic for the application, wherein the Hybrid Information-Centric Networking request is indicative of the determination; and
   receiving, at the device and from the Hybrid Information-Centric Networking source, one or more packets of the traffic for the application, after sending the Hybrid Information-Centric Networking request.

2. The method as in claim 1, wherein the Hybrid Information-Centric Networking request for the traffic for the application includes an additional request for retransmission of a packet when the determination is that the retransmission mechanism is to be used.

3. The method as in claim 1, wherein the Hybrid Information-Centric Networking request for the traffic for the application includes a forward error correction request when the determination is that the forward error correction mechanism is to be used.

4. The method as in claim 3, wherein the forward error correction request includes a particular forward error correction rate determined based on a loss probability.

5. The method as in claim 1, wherein the determination is based on rate of flow or loss probability of a communication channel used by the device.

6. The method as in claim 1, further comprising:
   reconstructing, by the device, a packet for the application using the forward error correction mechanism.

7. The method as in claim 1, further comprising:
   reconstructing, by the device, a packet for the application using the retransmission mechanism.

8. The method as in claim 1, wherein the attempt to optimize the delay budget objective is based on a number of devices executing the application in a group.

9. The method as in claim 1, wherein the attempt to optimize the delay budget objective takes into consideration congestion control.

10. The method as in claim 1, wherein the application is a group application executed by a plurality of devices in communication with one another.

11. An apparatus, comprising:
    one or more interfaces;
    a processor coupled to the one or more interfaces and configured to execute one or more processes; and
    a memory configured to store a process that is executable by the processor, the process when executed configured to:
       obtain a delay budget objective for traffic for an application to be sent by a Hybrid Information-Centric Networking source to the apparatus;
       make a determination as to whether a forward error correction mechanism or a retransmission mechanism is to be used by the traffic for the application to be sent by the Hybrid Information-Centric Networking source to the apparatus, in an attempt to optimize the delay budget objective;
       send to the Hybrid Information-Centric Networking source, a Hybrid Information-Centric Networking request for the traffic for the application, wherein the Hybrid Information-Centric Networking request is indicative of the determination; and
       receive, from the Hybrid Information-Centric Networking source, one or more packets of the traffic for the application, after sending the Hybrid Information-Centric Networking request.

12. The apparatus as in claim 11, wherein the Hybrid Information-Centric Networking request for the traffic for the application includes an additional request for retransmission of a packet when the determination is that the retransmission mechanism is to be used.

13. The apparatus as in claim 11, wherein the Hybrid Information-Centric Networking request for the traffic for the application includes a forward error correction request when the determination is that the forward error correction mechanism is to be used.

14. The apparatus as in claim 13, wherein the determination is based on rate of flow or loss probability of a communication channel used by the application.

15. The apparatus as in claim 11, the process when executed further configured to:
reconstruct a packet for the application using the forward error correction mechanism.

16. The apparatus as in claim 11, the process when executed further configured to:
reconstruct a packet for the application using the retransmission mechanism.

17. The apparatus as in claim 11, wherein the attempt to optimize the delay budget objective is based on a number of devices executing the application in a group.

18. The apparatus as in claim 11, wherein the attempt to optimize the delay budget objective takes into consideration congestion control.

19. The apparatus as in claim 11, wherein the application is a group application executed by a plurality of devices in communication with one another.

20. A tangible, non-transitory, computer-readable medium storing program instructions that cause a device to execute a process comprising:
obtaining a delay budget objective for traffic for an application to be sent by a Hybrid Information-Centric Networking source to the device;
making a determination as to whether a forward error correction mechanism or a retransmission mechanism is to be used by the traffic for the application to be sent by the Hybrid Information-Centric Networking source to the device, in an attempt to optimize the delay budget objective;
sending, to the Hybrid Information-Centric Networking source, a Hybrid Information-Centric Networking request for the traffic for the application, wherein the Hybrid Information-Centric Networking request is indicative of the determination; and
receiving, from the Hybrid Information-Centric Networking source, one or more packets of the traffic for the application, after sending the Hybrid Information-Centric Networking request.

* * * * *